US009678961B2

(12) United States Patent
Adams et al.

(10) Patent No.: US 9,678,961 B2
(45) Date of Patent: Jun. 13, 2017

(54) METHOD AND DEVICE FOR ASSOCIATING METADATA TO MEDIA OBJECTS

(75) Inventors: Matthew Adams, Cambridge (GB); Simon Evans, Worthing (GB)

(73) Assignee: Canon Europa N.V., Amstelveen (NL)

( * ) Notice: Subject to any disclaimer, the term of this patent is extended or adjusted under 35 U.S.C. 154(b) by 353 days.

(21) Appl. No.: 13/614,914

(22) Filed: Sep. 13, 2012

(65) Prior Publication Data
US 2014/0074836 A1    Mar. 13, 2014

(51) Int. Cl.
*G06F 17/30* (2006.01)
(52) U.S. Cl.
CPC .. *G06F 17/30038* (2013.01); *G06F 17/30997* (2013.01)
(58) Field of Classification Search
CPC ........... G06F 17/30038; G06F 17/3002; G06F 17/30053; G06F 17/30283; G06F 17/30864; G06F 17/30; G06F 17/30058; G06F 17/30743; G06F 17/30749; G06F 17/30766; G06F 17/30775
USPC ................................. 707/736, 737
See application file for complete search history.

(56) References Cited

U.S. PATENT DOCUMENTS

| 2006/0004914 | A1* | 1/2006 | Kelly et al. ................ 709/219 |
| 2006/0242178 | A1* | 10/2006 | Butterfield et al. .......... 707/100 |
| 2007/0156726 | A1 | 7/2007 | Levy |
| 2009/0259623 | A1 | 10/2009 | Mooneyham |
| 2012/0095976 | A1 | 4/2012 | Hebenthal |
| 2012/0197970 | A1* | 8/2012 | Arturi ........................ 709/203 |
| 2012/0331385 | A1* | 12/2012 | Andreas et al. .............. 715/716 |
| 2013/0218869 | A1* | 8/2013 | McConnell et al. .......... 707/722 |

FOREIGN PATENT DOCUMENTS

| CN | 101379464 | 3/2009 |
| CN | 101556617 | 10/2009 |
| CN | 102541981 | 7/2012 |

OTHER PUBLICATIONS

Apple, iPhoto '11, Sep. 2012, retrieved from http://web.archive.org/web/20120911084523/http://www.apple.com/uk/ilife/iphoto/ on Oct. 24, 2013.
Adobe, Photoshop Lightroom 4, Sep. 2012, retrieved from http://web.archive.org/web/20120911032839/http://www.adobe.com/products/photoshop-lightroom/features.html on Oct. 16, 2013.

* cited by examiner

*Primary Examiner* — James Trujillo
*Assistant Examiner* — Fariborz Khoshnoodi
(74) *Attorney, Agent, or Firm* — Canon U.S.A., Inc. IP Division

(57) ABSTRACT

Methods, systems, and devices for associating metadata with a media object that has been published on a plurality of social networks obtain a respective identifier by which the media object is identified on each of the plurality of social networks, retrieve metadata associated with the media object from each of the plurality of social networks using the corresponding identifier, and store the retrieved metadata in association with the media object.

5 Claims, 5 Drawing Sheets

METHOD AND DEVICE FOR ASSOCIATING METADATA TO MEDIA OBJECTS

BACKGROUND OF THE INVENTION

Field of the Invention

The present invention relates generally to the organization and display of digital content, and more particularly to the association of metadata with media objects such as photos and videos and the like.

Description of the Related Art

With the widespread adoption of social networks, it becomes quite common to have one's digital contents such as photos and videos published in several websites. As social networks provide the possibility for their members to, for example, comment on, tag, share, "like" a media object representing the published digital content, it became a tedious task for the owner of those objects to remember where they all have been stored or reproduced and follow the social actions and events relating to them. This is particularly true if a same media object is published in several social networks as it becomes difficult to keep track of it in all these networks.

It is therefore sought to improve the way metadata associated with media objects published in several social networks and representing the social history of those objects can be easily tracked and controlled by a user.

SUMMARY OF THE INVENTION

The present invention in its first aspect relates to a method of associating metadata with a media object that has been published on a plurality of social networks, the method comprising:

obtaining a respective identifier by which the media object is identified on each of the plurality of social networks;

retrieving metadata associated with the media object from each of the plurality of social networks using the corresponding identifier; and storing the retrieved metadata in association with the media object.

The present invention also relates in its other aspects to a corresponding non-transitory computer-readable storage medium and a device.

BRIEF DESCRIPTION OF THE DRAWINGS

Embodiments of the invention will now be described, by way of example only, with reference to the drawings in which.

DETAILED DESCRIPTION OF THE INVENTION

Figure 1:
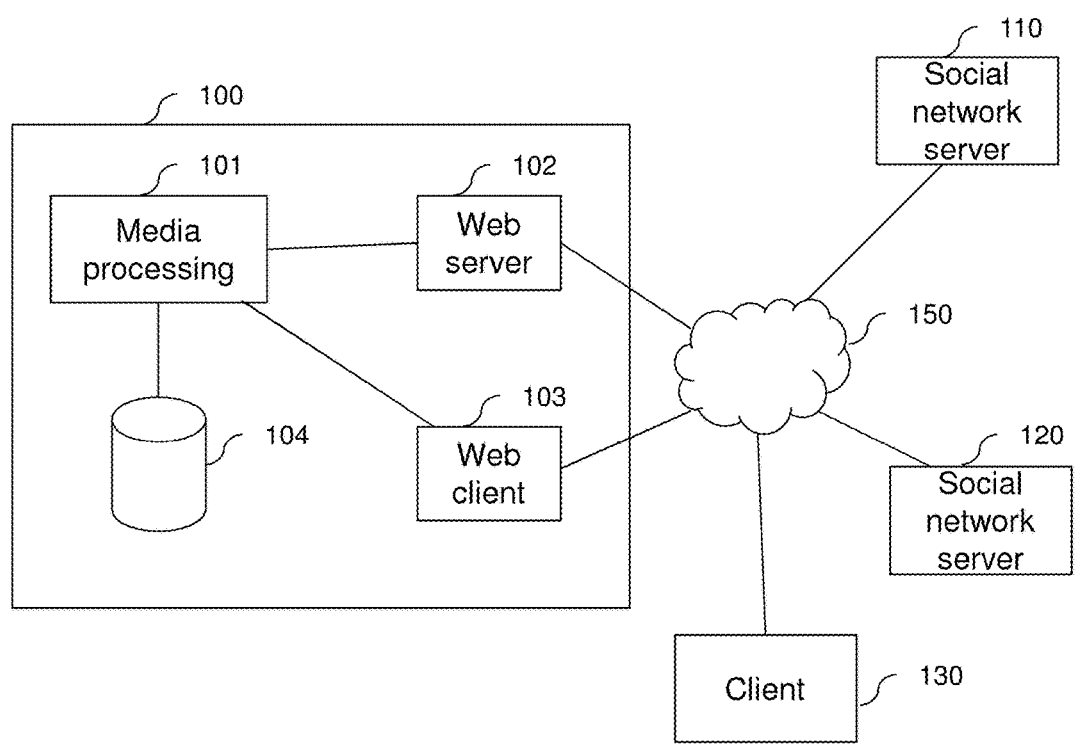
FIG. 1 illustrates an example of a communication system where the invention can be implemented.

FIG. 1 illustrates an example of a communication system where the invention can be implemented. The communication system comprises a media server device 100, a plurality of social network servers 110 and 120, a client device 130 and a communication network 150 interconnecting the different devices such as the Internet.

The media server device 100 provides means for a user to apply different services to media objects in a centralized and coherent way. Typically, the media server makes it possible for a user to upload, organize, edit, display and share media objects. Even though it is possible for the user to interact directly with a social network such as for example for sharing photos, interacting via the media server provides a single entry point over which it is possible to log the performed actions, gather information (metadata) from different social network servers and construct a social history for each published media object for example.

The media objects may represent for example images, videos, audio files, documents or the like. A media object may be also a combination of these elementary objects.

Metadata defining the social history of actions and events may comprise one or more members of the group consisting of: comments, tags, descriptions, favorites, annotations. A comment is for example a short description or a review added by a user. Tags may represent the text inserted at a specific position in the media object such as for example the name of a person identified in a photo. It could also be some particular sound or oral description inserted at a specific time position in a media object including an audio file. Favorites may include the "Likes" users may declare on a media object and annotations may include any other type of added information in relation with the media object.

Social network servers 110, 120 host the services of a social network. Generally, a social network offers its members the ability to interact with other members of the social network. It provides mechanisms for members to form connections with each other, communicate with each other, store information and share objects of interest, among other things.

Typical implementation of a social network is web based, i.e. the application running the social network is implemented in a web server, hosted in a device such as for example device 110 or 120, where members interact with the application website through web-based interfaces from client devices, such as client device 130, using a web browser. For example, a member can create an album and upload photos to that album using the web interface.

In addition to the web interface adapted for user interactions, most of the social networks provide an API (Application Programming Interface) to automate the interactions with the web server from a logic acting as a web client.

For example, Facebook provides such an interface for publishing media objects representing photos. Provided that a valid access token has been set up with the publish permission, a photo can be uploaded by issuing an HTTP POST request with the photo content and an optional description to one of the following Graph API connections:

//graph.facebook.com/USER_ID/photos

The photo will be published to an automatically created album for user defined by "USER_ID". All photos uploaded this way will then be added to this same album.

//graph.facbook.com/ALBUM_ID/photos

The photo will be published to a specific, existing photo album, represented by the ALBUM_ID.

Another example is Flickr which provides the following interface for uploading photos:

//api.flickr.com/services/upload/

An HTTP POST request taking at least the photo to be uploaded as argument is generated by the web client to the above address. If the upload is successful, an identifier of the uploaded photo is returned. The identifier makes it possible to uniquely reference the uploaded photo for future actions as will be discussed later, such as for example obtaining the comments associated with that photo, or the replacement of the photo (by sending a further POST request to the URL //api.flickr.com/services/replace/).

The media server device 100 according to an embodiment of the invention is a client-server based system and may include a http web server unit 102, a http web client unit 103, a database 104 and a media processing unit (MPU) 101.

Considering the client-server based system, a user at a client device 130 uses a browser to access the media server device 100 through the web server unit 102 embedded therein. The user can then upload media objects for storage at the media server 100 by generating http requests towards the web server unit. In response to a received request, the web server unit 102 passes the attached media object to the media processing unit 101 for storage in the database 104. The user can also download media objects previously stored in the database for display in the web browser at the client device 130 or for local storage. More generally, the web browser at the client device 130 provides the user with an interface to perform various actions such as for example viewing metadata associated with the displayed media object, modifying the media object (filtering operations, resizing, photo cropping, etc.), publishing the media object to a social network, or the like.

If the user instructs the media server device 100, via the provided user interface, to publish a media object in a given social network, the media processing unit 101 communicates a copy of the media object with the necessary arguments to the http web client unit 103. Arguments may include for example the URL (Uniform Resource Locators) of the social network server at which the media object is to be published, user account information such as for example USER_ID as discussed before and the necessary credentials, desired permissions for later viewing of the media object (restricted access to friends for example or public) and metadata associated with the media object (if any) provided by the user or generated by the media processing logic. The http web client unit 103 then generates an http request (typically an HTTP POST request) with the arguments in an appropriate format compatible with the API (Application Programming Interface) provided by the targeted social network server.

The copy of the media object that is published may be just an exact duplication of the version of the media object that is stored in the database 104 or a processed version. The user may want for example to reduce the size or resolution of the media object, apply different color settings or any other possible processing aimed to adapt the media object to the hosting social network server.

Alternatively to the client-server model as depicted by FIG. 1, the media server device can be implemented locally within the client device 130. The interaction between the user and the media processing unit 101 may then be performed using a dedicated, non-web based user interface. In this implementation, the http server unit 102 becomes optional but the http web client 103 is still needed for interacting with the remotely located social network servers 120 and 110.

An example of a hardware arrangement 200 of the media server device will be described below using the block diagram shown in FIG. 2.

Figure 2:
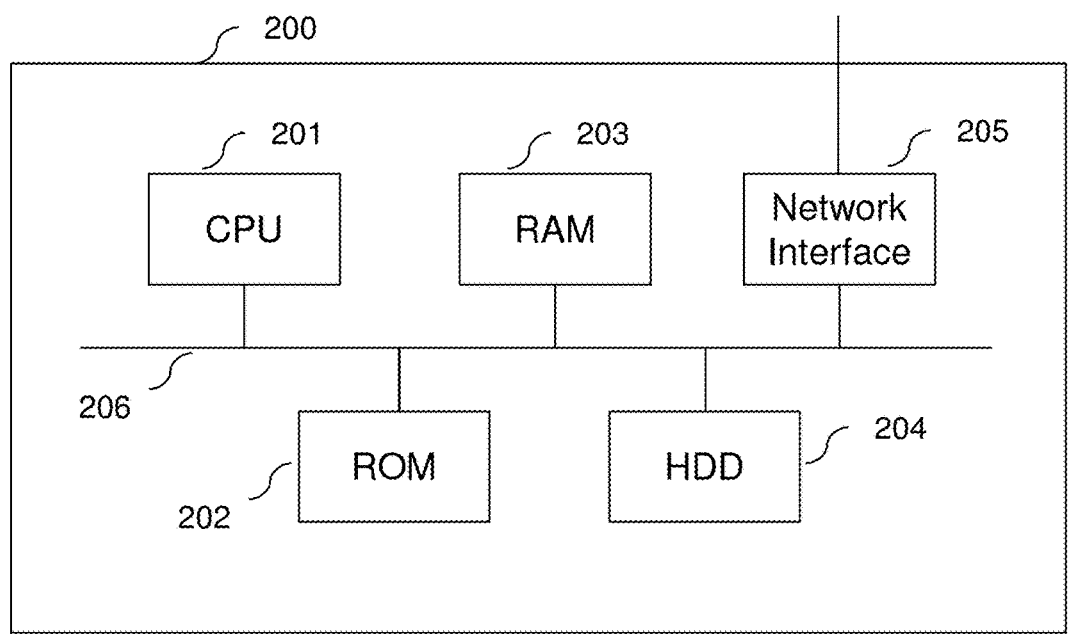
FIG. 2 illustrates an example of a hardware arrangement of the media server device adapted to implement an embodiment of the invention.

Referring to FIG. 2, a CPU 201 executes various kinds of data processing associated with media processing unit 101, the web server unit 102 and the web client 103, and controls respective components connected to a bus 206. A ROM 202 is a read only memory which stores a basic control program and control data. A RAM 203 is a random access memory used for various kinds of arithmetic processing of the CPU 201 and to temporarily store data. A storage unit 204 stores a system program such as an OS (Operating System) of the information processing and a program for running the media processing 101, the web server unit 102 and the web client 103 units, and is used as a temporary storage area during data processing. The storage unit 204 may serve also as a storage folder for the database 104. The storage unit 204 mainly includes a magnetic storage device (HDD), but it may be a device which loads external media such as a DVD, and memory card, and which reads and records data. A network interface 205 provides the physical connection of the media server device to the communication network 105 such as the Internet.

Figures 3, 4:
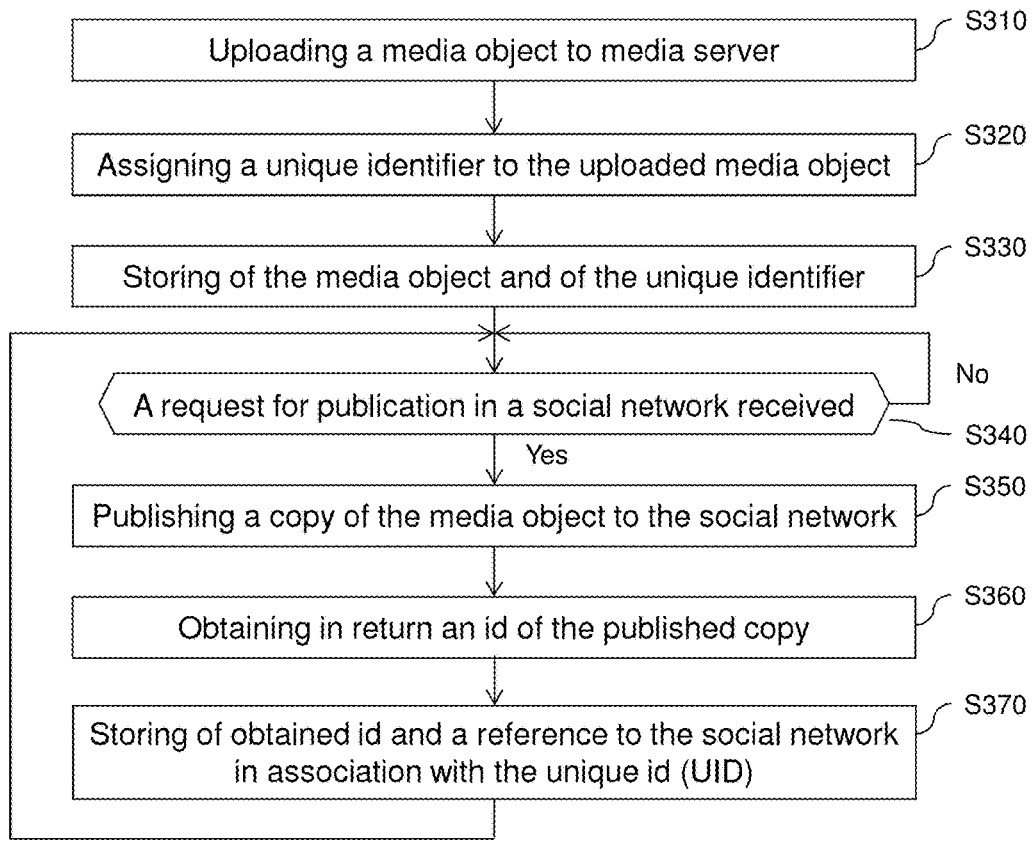
FIG. 3 is a flowchart that describes the process by which the media server device maintains a list of social network servers holding a copy of a media object that is referenced in its database.
FIG. 4 illustrates an association table listing the social networks holding a media object copy.

FIG. 3 is a flowchart that describes the process by which the media server device maintains a list of social network servers holding a copy of a media object that is referenced in its database. This process results into constructing a table, for each media object that is published in one or more social network servers, containing references to those social networks and identifiers for accessing the media object from the corresponding social network.

The flowchart is executed for example by the media processing unit (MPU) 101 following instructions of a segment of the program stored in ROM 202 of device 200.

At step S310, a media object is first uploaded the media server device 100 and stored in database 104 for example. As explained earlier with regards to FIG. 1, the uploading may be performed by a user, from a client device 130, using a web browser interface or a dedicated desktop application. This is typically the case when the media object to be uploaded, e.g. a photo or a video, is stored in an external storage device such as a camera or flash disk memory. Media objects may be first transferred to a local folder of the client device 130 and then uploaded to the media server 100. For this, a communication is established with the http server unit 102. Typically this uses a HTTP POST request with the media object taken as an argument of the request and the parameters added as a query string in the URL referencing the http server unit 102.

Alternatively, the uploading may be performed by a user from a social network server, e.g. social network server 110, in which the media object was initially published. This makes it possible to have a copy of that media object centrally stored in the media server 100 which can later be re-published in other social network websites. The user can perform this action at client device 130 using a web browser interface (web page) downloaded from web server unit 102 via which the user will send his instructions. The instructions are then transferred to the web client unit 103 for sending the appropriate http requests towards the social network server, i.e. social network server 110, for uploading the media object to the media server device 100. Note that we are referring here to media object "uploading" relatively to the media server device 100, even if this also corresponds to media object "downloading" when reference is made to social network server 110.

At step S320, a unique identifier (UID) is assigned to the uploaded media object by the MPU 101. This identifier is mainly used to create a unique entry in database 104 for the media object. Different media objects will have different UIDs.

Both the media object and the assigned identifier are then stored at step S330. It is assumed here that both the media object and the identifier are stored in the database 104, but alternate solutions exist such as storing the media object in a storage device (e.g. HDD 204) and storing the identifier and a path to the media object only in the database 104. This latter option is be preferable if the size of the media object is big.

When a request for publication in a social network of the stored media object is received from a user at a client 130 (positive test at step S340), a copy of the media object is published in that social network in step S350. It is not necessary for the copy to be exactly the same as the stored media object, but it is sufficient that they relate to each other. For example, a photo or a video may be stored in full resolution in the media server device 100, but only a lower resolution (or cropped) copy is published to the social network since it is generally intended for display only with no further processing to be applied to it.

In response to the publication of the media object, the social network server returns an identifier (or "id" in short) of the published object in step S360. In this way, the id is generally obtained from the response received by the web client unit 103.

If we refer again to Facebook and Flickr examples discussed above, the publication (upload) of a photo in Facebook can be performed by sending a HTTP POST request containing the photo to the URL:
 //graph.facebook.com/USER_ID/photos,
in response to which a JSON formatted id is received:

```
{
    "id": "1001207389476"
}
```

For Flickr the HTTP POST request is sent to the following URL:
 //api.flickr.com/services/upload/,
and if the upload is successful, an xml formatted response is returned:
 <photoid>123</photoid>
where 'photoid' is an xml tag identifying the identifier of the photo and '123' the returned id.

In a final step S370, the obtained id and a reference to the social network are stored in associated with the unique id (UID) in the database 104. Any reference that makes it possible to identify the social network server in which the media object is published can be used. As an example, the domain name part of the URL of the social network API is used (cf. FIG. 4).

Steps S350 to S370 are executed for each social network for which a publication request has been received. The process results then at the end in constructing of a table per media object in database 104, like the one illustrated in FIG. 4.

In the example of FIG. 4, it is assumed that media object of unique id "1" is published in three social networks, Facebook, Flickr and Google+. The corresponding ids in these social networks are respectively "115", "123" and "123". Note that same id "123" is assumed to have been obtained from two social networks to show that these ids are not necessarily unique as they are generated independently by each social network server.

Actions on the media object can thus be performed using the "id" field and the domain name part of the URL to which will be appended a path defining the action to be performed.

For example, retrieving metadata information attached to a photo media object can be performed in the case of Flickr with the following request:

http://api.flickr.com/services/rest/?method=
flickr.photos.getInfo&api_key=
APIKEY&photo_id=PHOTO_ID&format=json Here the method "flickr.photos.getInfo" is appended to the request to get information about the photo identified by PHOTO_ID. The response will be formatted as a JSON object. Filtering can then be performed on the returned information to extract the relevant part of metadata that is to be tracked, for example the author name of the photo can be ignored while the comments associated with the photo can be kept.

The "Type" column in FIG. 4 indicates whether the media object has been uploaded to the corresponding social network server in execution of step S350 (Type="published") or if the media object was initially stored in the social network server from which it has been downloaded, and thus uploaded to the media server, in execution of step S310 (Type="downloaded"). This field gives an information about from where the original copy of the media object has been obtained, which can be provided as a further indication to the user.

Figure 5:
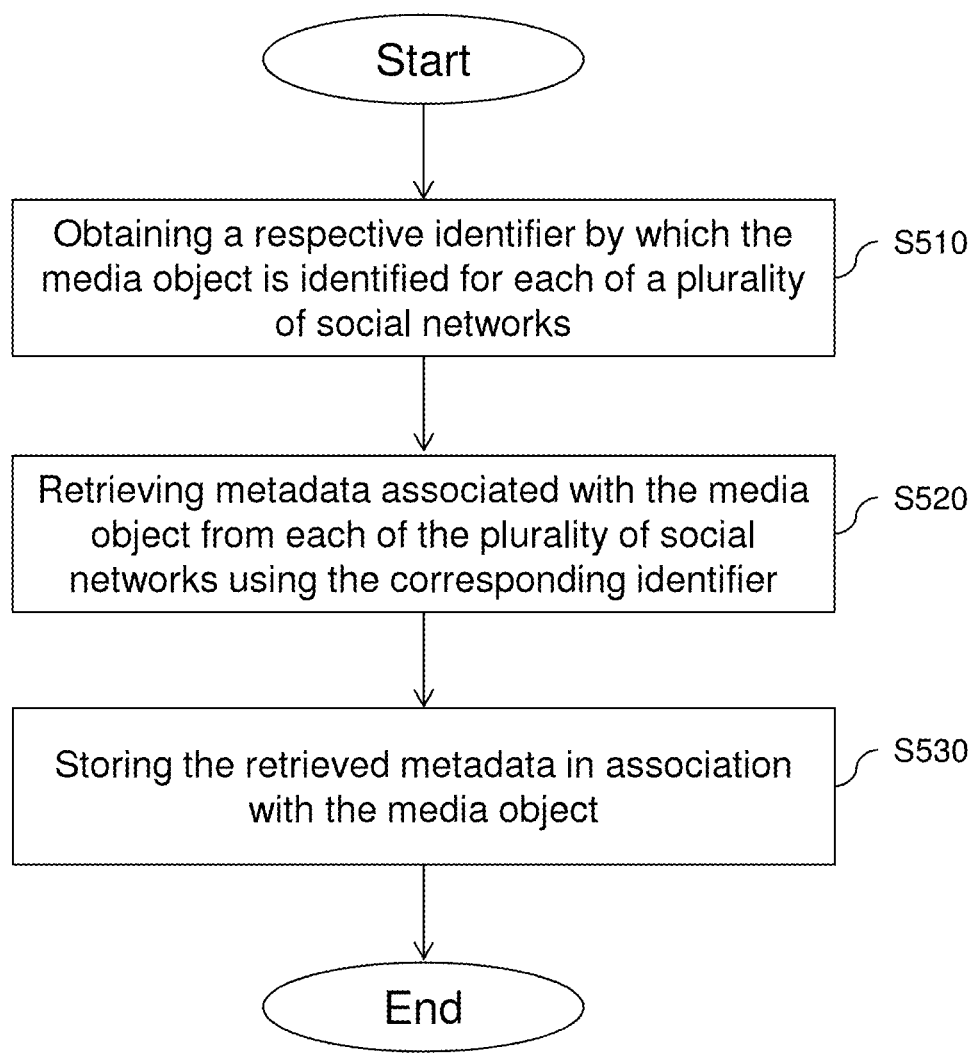
FIG. 5 is a flowchart that describes the process of associating metadata data to a media object according to an embodiment of the invention.

FIG. 5 is a flowchart that describes the process of associating metadata data to a media object according to an embodiment of the invention. The flowchart is executed for example by the media processing unit (MPU) 101 following instructions of a segment of the program stored in ROM 202 of device 200.

At step S510, an identifier by which the media object is identified for each of a plurality of social networks is obtained from the database 104. By referring to the table illustrated in FIG. 4 and constructed as a result of the execution of flowchart of FIG. 3, the MPU 101 can easily determine the list of social network servers on which a given media object is published (Facebook, Flickr, Google+) and the id by which this media object is referenced in each of these social networks.

Here the given media object of interest is the one for which metadata information is to be collected. Also, and as indicated before, it should be understood that by referring to a published media object means that either the publication has been performed by the MPU (type "published" in table) or the media object was initially published in the social network (type "downloaded" in table).

At step S520, metadata associated with the media object is retrieved from each of the plurality of social networks using the corresponding identifier. For this, an appropriate request is constructed compliant with the API of the social network.

As examples, in the case of Flickr, the method "flickr.photos.getInfo" can be used as specified before. In the case of Facebook, For example, the following request can be used in Facebook:

---
https://graph.facebook.com/PHOTO_ID?metadata=1&access_token=ACCESS_TOKEN

--- where PHOTO_ID is the id of the media object which is here a photo and ACCESS_TOKEN provides the necessary authentication rights to access the resources. The response is a JSON object that contains for example an element "comments" containing users' comments and "likes" containing the identifies of the users who liked the photo as illustrated below.

---
```
{
  "id": "98423808305",
  ...
  "comments": {
    "data": [
      {
        "id": "98423808305_1152793",
        "from": {
          "name": "Kayla Nicole Koone",
          "id": "690340077"
        },
        "message": "Nice. :)",
        "can_remove": false,
        "created_time": "2009-06-25T19:18:17+0000",
        "like_count": 0,
        "user_likes": false
      },
      {
        "id": "98423808305_1152797",
        "from": {
          "name": "Caitlin Catherine Kennedy",
          "id": "1658825260"
        },
        "message": "THT IS AMAZING!!!!!!!!!!!!!!!!!!!!!!!!!!!!!!!",
        "can_remove": false,
        "created_time": "2009-06-25T19:18:25+0000",
        "like_count": 0,
        "user_likes": false
      },
    ],
  },
  "likes": {
    "data": [
      {
        "id": "100003131452728",
        "name": "Morjan Suzi"
      },
      {
        "id": "100001950006586",
        "name": "Emily Paula"
      },
    ],
  }
}
```

---

At step S530, the relevant retrieved metadata is stored in association with the media object in database 104.

By forming such an association, metadata can be presented to the user in a coherent and aggregated way when for example rendering the media objects. An example is given along with FIG. 6 below.

The process of FIG. 5 may be executed at regular time intervals, for example at midnight of each day so that to update the local database 104 of media server device 100. Alternatively or in addition, the retrieval is performed each time a media object is requested for display by a user. The associated metadata can thus be made available simultaneously while displaying the media object, or ready to be display if the user wishes so.

Figure 6:
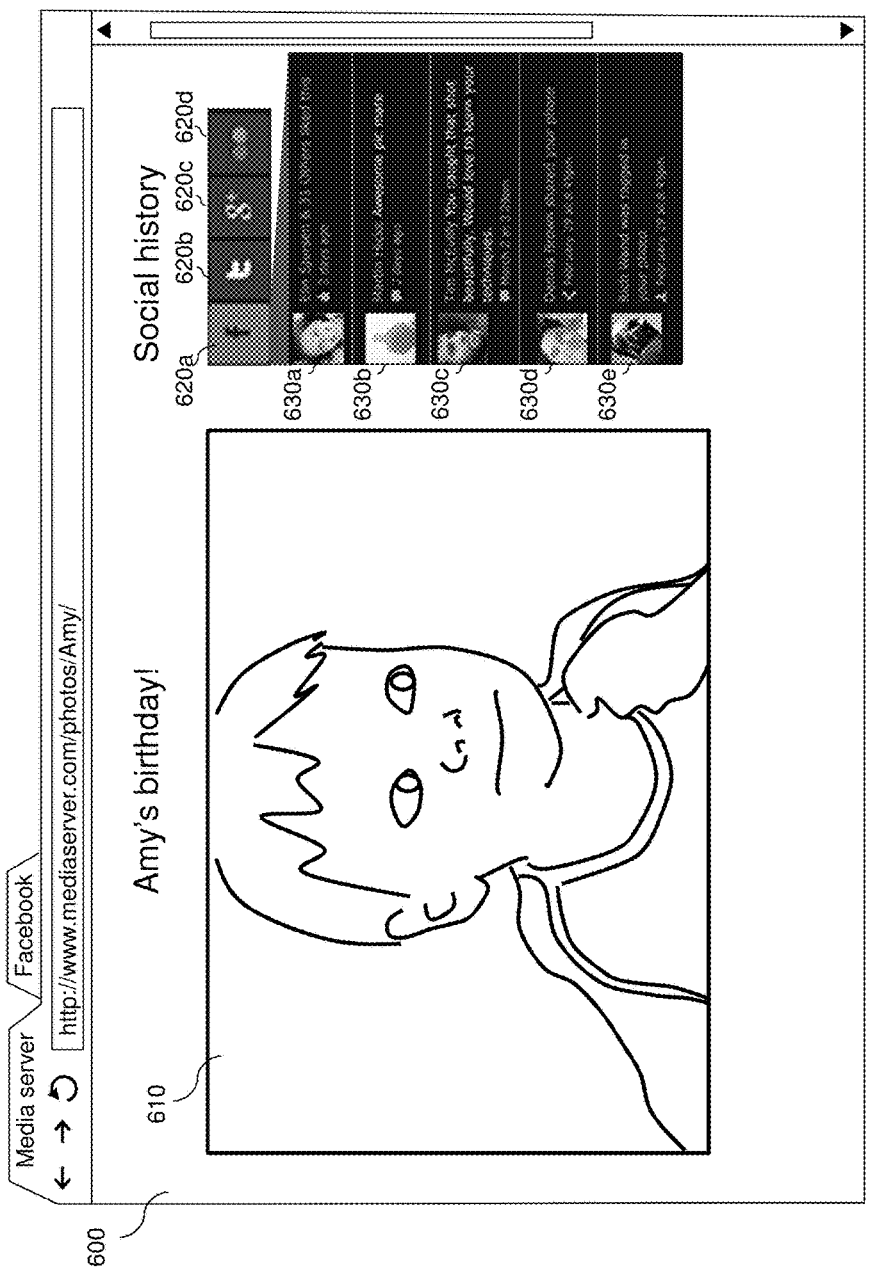
FIG. 6 is a screenshot illustrating the display of metadata aggregated from a plurality of social networks and associated with a photo according to an embodiment of the invention.

FIG. 6 is a screenshot illustrating the display of metadata aggregated from a plurality of social networks and associated with a photo according to an embodiment of the invention.

In the illustrated example, a web browser displays a web page 600 containing a photo 610 and associated metadata on the right hand side of the photo.

Metadata is retrieved from four social networks in the shown example: Facebook 620a, Twitter 620b, Google+ 620c and Flickr 620d, but only metadata of one given social network is displayed at a time by clicking on the corresponding icon. Of course it may be possible to alternately display an aggregation of all retrieved metadata relating to all social networks at the same time.

In the illustrated example, it is the Facebook icon 620a that is supposed to be active. A list of the corresponding social history of events and actions are then displayed where 630a corresponds to a "Like", 630b and 630c correspond to a comment, 630d is an annotation that the photo has been shared and 630e indicates the identity of a user tagged in the photo.

Gathering metadata from different social networks for a given media object and making them accessible from a single place greatly improves user experience and provides control about the events relating to a data object, several copies of which have been spread over the Internet.

The invention claimed is:

1. A computer-implemented method of associating metadata with a media object, the method comprising:
    assigning a unique identifier to a media object;
    separately publishing the media object to a plurality of social networks;
    obtaining a plurality of media-object identifiers from the plurality of social networks and storing the plurality of media-object identifiers in association with the unique identifier, wherein obtaining the plurality of media-object identifiers from the plurality of social networks includes, for each social network of the plurality of social networks to which the media object has been published, obtaining a media-object identifier of the plurality of media-object identifiers by which the media object is identified on that social network;
    retrieving, from each social network of the plurality of social networks, metadata that is stored on the social network in association with the media object using the media-object identifier of the plurality of media-object identifiers by which the media object is identified on that social network;
    storing the retrieved metadata in association with the media object; and
    displaying the retrieved metadata to a user with an indication of the social network from which the metadata has been retrieved.

2. The method of claim 1, wherein the metadata comprises one or more members of the group consisting of: comments, tags, descriptions, favorites, annotations.

3. The method of claim 1, wherein the media object is one of an image, a video, an audio file, and document.

4. A non-transitory computer-readable storage medium storing instructions of a computer program which, when run on a device, causes the device to execute the steps of:
    assigning a unique identifier to a media object;
    separately publishing the media object to a plurality of social networks;

obtaining a plurality of media-object identifiers from the plurality of social networks and storing the plurality of media-object identifiers in association with the unique identifier, wherein obtaining the plurality of media-object identifiers from the plurality of social networks includes, for each social network of the plurality of social networks to which the media object has been published, obtaining a media-object identifier of the plurality of media-object identifiers by which the media object is identified on that social network;

retrieving, from each social network of the plurality of social networks, metadata that is stored on the social network in association with the media object using the media-object identifier of the plurality of media-object identifiers by which the media object is identified on that social network;

storing the retrieved metadata in association with the media object; and displaying the retrieved metadata to a user with an indication of the social network from which the metadata has been retrieved.

5. A device associating metadata with a media object, the device comprising:

a management unit configured to assign a unique identifier to the media object;

a publishing unit operable to publish the media object to a plurality of social networks;

an obtaining unit configured to obtain a plurality of media-object identifiers from the plurality of social networks and to store the plurality of media-object identifiers in association with the unique identifier, wherein to obtain the plurality of media-object identifiers from the plurality of social networks, the obtaining unit is configured to, for each social network of the plurality of social networks to which the media object has been published, obtain a media-object identifier of the plurality of media-object identifiers by which the media object is identified on that social network;

a retrieving unit configured to retrieve, from each social network of the plurality of social networks, metadata that is stored on the social network in association with the media object using the media-object identifier of the plurality of media-object identifiers by which the media object is identified on that social network;

a storage unit configured to store the retrieved metadata in association with the media object; and a display unit configured to display the retrieved metadata to a user with an indication of the social network from which the metadata has been retrieved.

* * * * *